Jan. 19, 1960 C. F. COVER ET AL 2,921,423
TIRE LOADER
Filed June 13, 1957 2 Sheets-Sheet 2
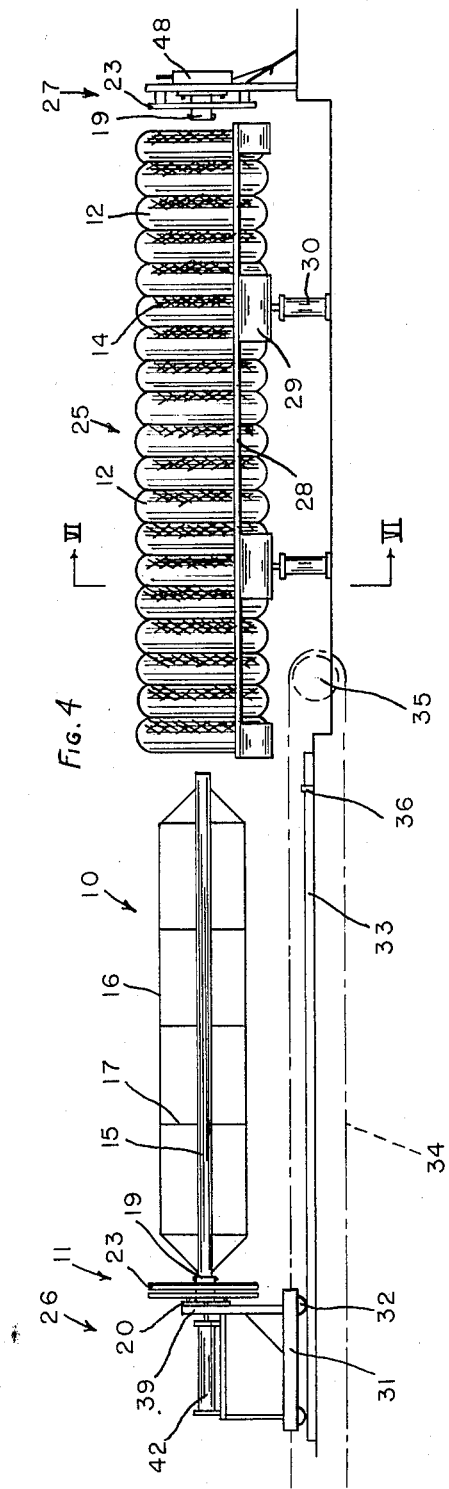
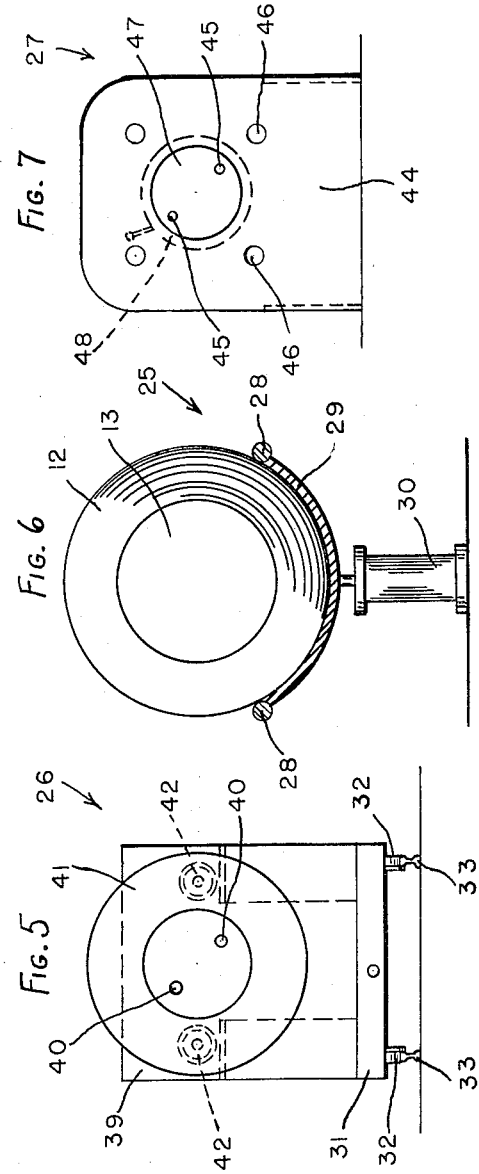
INVENTOR
CHALMERS F. COVER
DAVID G. COVER
BY Francis J. Klempay
ATTORNEY United States Patent Office 2,921,423
Patented Jan. 19, 1960

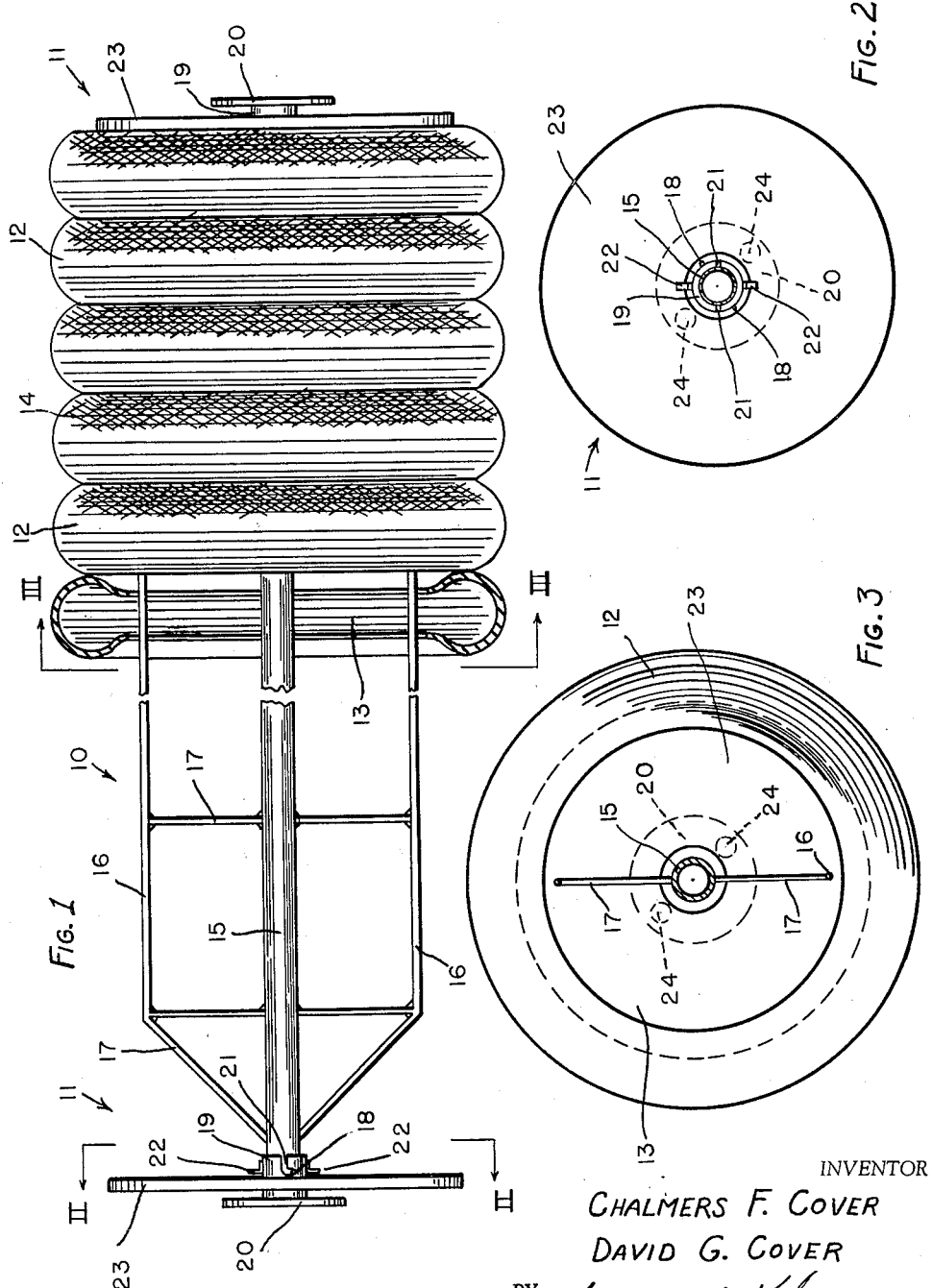

2,921,423

TIRE LOADER

Chalmers F. Cover and David G. Cover, Kinsman, Ohio

Application June 13, 1957, Serial No. 665,431

9 Claims. (Cl. 53—124)

The present invention relates generally to the shipping and packaging art and more particularly to improved methods and apparatus for storing, handling, packaging and/or transporting resilient annular members, such as automotive vehicle tires, for example. Throughout the following specification the teachings of the present invention will be disclosed in connection with automotive vehicle tires but, as will be hereinafter more fully apparent, such teachings are equally applicable to other similar products and articles.

Heretofore, relatively few advances have been made in the art of handling, storing, packaging and/or transporting rubber automobile tires. Even in highly automated automobile plants and rubber tire plants, loading, unloading, storage, etc., of tires is performed by manual labor. It should be apparent that methods and apparatus directed to the more efficient handling of automobile tires would be of great utility to the automotive and tire industries. In this respect, the present invention seeks to provide methods and apparatus directed to the more efficient handling of tires which greatly reduce the amount of manual labor involved and increases the productivity of each individual worker. This is particularly important and advantageous to the automotive and tire industries because of the high wages prevalent even for unskilled labor.

In addition, as will be fully understood by those skilled in this particular art, present day methods of handling and transporting tires do not and cannot take advantage of the advances made in the general transportation art. According to present practice it is impossible to load railroad cars or trucks to their full weight carrying capacity because of the bulky nature of tires and even though the transporting vehicle is completely filled the transporting operation is relatively inefficient since full use is not made of the allowable weight carrying capacity. This, of course, means that many more railroad cars and trucks are required than would be necessary if the entire weight carrying capacity of each vehicle could be used. Need therefore exists for methods and apparatus wherein the entire weight carrying capacity of transporting vehicles can be used. The present most widely accepted method of loading tires into railroad cars and trucks is to stack them by hand in overlapped relation in one-at-a-time fashion. Not only is a portion of the railroad car or truck weight carrying capacity wasted but also the manual loading and unloading operations are slow and costly.

In view of the above, it is the primary or ultimate object of the invention to provide improved methods and apparatus for handling, storing, transporting, etc., rubber automobile tires. A more specific object of the invention is to provide methods and apparatus for loading and transporting tires wherein the full weight carrying capacity of transporting vehicles may be utilized.

A further object of the invention is to provide methods and apparatus of the character described which substantially reduces the time and labor required to load and unload transporting vehicles. Another object of the present invention is to provide improved methods and apparatus which greatly facilitate the storage of tires.

Yet another object of the present invention is to provide methods and apparatus for handling tires wherein a plurality of tires are squeezed and comprsesed to appreciably reduce their volume.

Another object of the invention is to provide a new and novel tire rack having the characteristics outlined above which is extremely simple in construction and operation. As will be hereinafter more fully explained, the tire rack comprises an elongated frame adapted to be received through the central openings in a plurality of axially aligned tires and a pair of identical end assemblies detachably received on the ends of the frame to clamp and hold the tires in position.

Another important object of the invention is the provision of a plant installation for a tire rack constructed in accordance with the teachings of the present invention whereby the rack may be loaded in a fast and efficient manner.

These, as well as other objects and advantages of the invention, will become more readily apparent upon consideration of the following detailed specification and accompanying drawing wherein there is described and shown a preferred illustrated embodiment of the invention.

In the drawing:

Figure 1 is a fragmentary side view of a tire rack constructed in accordance with the teachings of the present invention;

Figure 2 is an end sectional view taken along the section line II—II of Figure 1;

Figure 3 is an end sectional view taken along the section line III—III of Figure 1;

Figure 4 is a side elevational view of a suggested tire loading installation embodying the tire rack of the present invention;

Figure 5 is a front view of the movable cart and appurtenant apparatus carried thereby used in the installation shown in Figure 4;

Figure 6 is an end sectional view taken along the section line VI—VI of Figure 4 showing specifically the construction of the tire loading fixture or jig; and Figure 7 is a front view showing the structure of the stationary end assembly applying means used in the tire loading installation shown in Figure 4.

Referring now to the drawing, and initially to Figures 1-3 thereof, there is shown a tire rack constructed in accordance with the teachings of the present invention which comprises an elongated frame 10 and a pair of identical end assemblies 11 which are adapted to be received on each end of the frame 10 for holding and clamping a plurality of axially aligned automobile tires 12. The tires 12 are of well known construction, each being annular in shape to define a center opening 13 and having a hollow generally U-shaped cross section of appreciable axial dimension with a road-bearing tread 14 formed on the outer periphery thereof, and, as such, form no part of the present invention. As will be hereinafter more fully explained, the tires 12 are loaded on the frame 10 and compressed or squeezed by the end assemblies 11 to reduce their volume so that full use may be made of the weight carrying capacity of the transporting vehicles, not shown.

The frame 10 consists primarily of an elongated tubular member 15 and a pair of rods 16 disposed on opposite sides of the tubular member 15. The rod 16 extend generally the entire length of the tubular member 15 in parallel relation therewith and are supported by a plurality of transversely extending struts 17 extending from the tubular member to the rods and attached thereto by welding or other convenient attachment means.

The distance between the rods 16 is slightly less than the diameters of the central openings 13 in the tires 12 so that the same may pass freely over these members. The rods 16 are preferably made from relatively thin diametered rod stock and need not have excessive strength characteristics since their function, as will be hereinafter more fully explained, is to prevent sagging of the tires intermediate the end assemblies 11 when the tire rack is loaded.

The tubular member 15 ideally has an internal diameter of such size that a fork, of a conventional lift truck, not shown, may be inserted thereinto for ease of handling. The tubular member, as shown in Figures 1 and 2 of the drawing, is provided with a pair of oppositely disposed and radially extending projections 18 on each end thereof which cooperate with portions of the end assemblies 11 to hold the tire rack in assembled relation.

As indicated above, each of the end assemblies 11 is identical and to avoid unnecessary repetition in the specification only one of these assemblies will be described in detail. Each of the assemblies 11 comprises a tubular collar 19 mounting at the rear end thereof an annular end plate 20. The internal diameter of the tubular collar 19 is slightly larger than outer diameter of the tubular member 15 so that the collar may be fitted over the end of this last mentioned member. However, the projections or lugs 18 extend a distance beyond the outer diameter of the collar 19 and to accommodate these lugs and provide locking means for securing the end assembly to the tubular member 15 the collar is provided with a pair of oppositely disposed slots 21. Each of the slots 21 extends parallel with respect to the longitudinal axis of the collar 19 for a portion of its length and circumferentially of the collar for another portion of its length. The arrangement is such that the collar 19 is first positioned so that the forward ends of the slots 21 and the projections 18 are aligned, then the collar is moved over the end of tubular member 15, and then the collar is turned to seat the projections 18 in the circumferentially extending portions of the slots 21 thereby locking the end assembly on one end of the tubular member 15. The projections or lugs 18 and the slots 21 form, in effect, a quickly releasable bayonet-type of locking means for the end assemblies and the frame. Of course, it is within the purview of the present invention to provide other types of locking means if the same are desired.

Mounted on the outer peripheral surface of the collar 19 behind the slots 21, but spaced forwardly of the end plate 20, are a pair of oppositely disposed and radially extending angles 22. These angles serve as abutment stops for a large annular retaining plate 23 which is loosely mounted on the collar 19 and is of sufficient size to bear against the main sidewall portions of the tires 12 in a manner which will be more fully explained. Of course, the diameter of the central opening in the retaining plate 23 is smaller than the distance between the projecting legs of the angles 22. It is contemplated that the retaining plate 23 will be made from steel or be of reinforced wooden construction in order that the same will be capable of withstanding the pressures exerted thereon when a plurality of tries are loaded on the rack and the end assemblies are attached to the frame.

The end plate 20 has a pair of apertures 24 therein which are provided to receive a tool for turning the collar to lock or unlock the end assembly and the frame. Such a tool may be of the hand type, not shown, or may be of the power operated type to be later described.

Considering now the use of the apparatus above set forth, initially the rack is prepared by placing one of the end assemblies 11 on one end of the frame 10 and locking the same in position in the manner above described. In order to facilitate loading an auxiliary guide rod, not shown, is positioned within the opening in the other end of the tubular member and allowed to extend therefrom an appreciable distance. A plurality of tires are then loaded on the frame, the number of tires, of course, being dependent on the individual axial length of each tire and the length of the tubular member. However, more tires are positioned on the frame and the guide rod than it takes to fill the frame—i.e. the number of tires mounted on the guide rod and the frame times the axial dimension of an individual tire is appreciably greater than the length of the frame itself. Obviously, the attached end assembly 11 prevents the tires from falling from the frame and the guide rod during loading.

With the tire rack thus prepared the operator positions the other detached end assembly over the protruding end of the guide rod with the slots 21 in the collar 19 aligned with the projections or lugs 18 on the end of the tubular member 15. The frame 10 and the end assembly 11 attached thereto are held in rigid relation and this may be conveniently done in a jig or fixture or by placing the end plate 20 and retaining plate 23 of the attached end assembly against a solid support. Then pressure is applied against the back surface area of the retaining plate 23 associated with the other end assembly thereby causing this retaining plate to bear against the sidewall of the outermost tire. The pressure applied to retaining plate 23 is of such magnitude that the individual tires are compressed and the end assembly will move over the guide rod and onto the end of the tubular member 15. When the projections or lugs 18 are aligned with the circumferential portions of the slots 21 the operator turns the collar 19 to lock this end assembly 11 in attached relation on the end of the frame. The turning of the collar 19 may be accomplished by hand or with the use of a tool insertable in the apertures 24 as above described, but irrespective of the means used to turn the collar 19, it will be observed that this operation is one of utmost ease since sufficient force is applied to and maintained on the retaining plate 23 whereby this member is floatingly mounted on the collar 19 between end plate 20 and angles 22 until the collar 19 is turned to engage the locking means. Thus, there is actually no force exerted on the collar 19 which impedes the turning thereof to lock the end assembly on the frame. After turning the collar 19 to engage the locking means the compressing force on the retaining plate 23 is removed and this member is forced outwardly into engagement with the end plate 20 under the expansive forces exerted by the compressed tires whereby, as is readily apparent, the end assemblies are tightly locked on the frame. With both of the end assemblies locked on the ends of the frame and the tires compressed and squeezed therebetween the tire rack is ready to be loaded in a transporting vehicle. The pressure of the tires acting outwardly against the retaining plates 23 will be transferred to the end plates 20 thereby preventing the locking means from becoming unlocked.

To load the tire rack into a transporting vehicle the operator may use a conventional lift truck, not shown, in a manner to insert the forks thereof under the loaded tire rack intermediate its ends and then move the same to the vehicle. Or, one of the forks of the truck can be inserted in one end of tubular member 15 and the loaded tire rack moved in this manner. It should be apparent that more than one loaded rack may be moved at a time and that the resultant loading operation is much more efficient than hand stacking each individual tire in an overlapping fashion in the transporting vehicle.

Because of the appreciable compression of the tires on the tire rack it is possible to load more tires in a given vehicle and take full advantage of the load carrying capacity thereof. As an example, we have found that if the tubular member 15 is approximately eight feet long the tire rack can be loaded with approximately twenty to twenty-five tires (depending on the axial dimensions thereof) which normally occupy a space of ten feet when stacked in aligned relation but when compressed occupy a space of only eight feet. Thus, a reduction of approximately twenty percent in the space required for transporting or storing a given number of tires is afforded and this allows full utilization of the weight carrying capacity of the vehicle. The limiting factor in the number of tires that can be loaded on any one rack is that the pressure must not be of such a high value to break the cords in the sidewalls of the tires. To eliminate any possibility of damage to the tires the racks can be manufactured in standard lengths and a limit set on the number of tires of each size the racks will safely hold. Of course, it is within the scope of the invention to make the size of the racks any size that is desired for a given size of tire. Further, the tubular member 15 may be of telescopic construction to eliminate the need for an auxiliary guide rod if so desired.

In loading the transporting vehicle the loaded tire racks may be stacked one on top of the other in nesting relation to take full advantage of the space provided and the load carrying capacity of the vehicle. The racks are also preferably dimensioned to take full advantage of the space available in the transporting vehicle. It will be noted that the tire racks hold a plurality of tires in a single compressed mass whereby the same are easily moved and transported. The rods 16 supported from the tubular member 15 prevent any sagging of the individual tires intermediate the end assemblies 11 in the manner shown in Figure 1. Thus the resultant loaded tire rack has structural characteristics which provide a compact but yet strong assembly well adapted for moving and transporting.

When the transporting vehicle arrives at its destination the tire racks are unloaded therefrom, by a lift truck, for example, and the tires may then be sorted while still on their racks. This not only reduces the storage space required for any given number of tires but also facilitates storage and protects the tires from damage due to the strength of the resultant loaded tire rack. As the tires are needed the racks can be individually unloaded. The unloading operation for the racks is characterized by its extreme simplicity since the only thing which need be done is turn one of the collars 19 to release the locking means and the end assembly will be pushed from the end of the tubular member 15. The tires may then be taken off the rack (a suggested method being lifting the other end assembly in a vertical direction so that the tires will fall from the frame) for use as desired. The rack may then be disassembled by removing the other attached end assembly and shipped back for another load of tires. Although one of the end assemblies 11 may be permanently attached to the frame 10 it is preferred that both be detachable to allow collapsing of the rack for shipping back to the tire factory, for example.

In many plants, such as those in the tire and automotive industries where great numbers of tires are employed, it may be desirable to provide a plant installation to realize the full advantages of the methods and apparatus disclosed above and such an arrangement is shown in Figures 4–7 of the drawing. The installation consists of three main integral parts—a tire loading jig or fixture 25, a movable cart 26 which is adapted to mount one of the end assemblies 11 and the frame 10 and a stationary support 27 adapted to carry the other end assembly 11 and mounting apparatus for turning the collar 19 of the end assembly carried thereby to lock the same on the frame 10.

Considering first the structure of the jig or fixture 25, this apparatus may comprise a pair of parallel longitudinally extending rods 28 which are joined intermediate their ends by the arcuate supporting plates 29. A pair of spaced fluid lifting cylinders 30 have their piston rods joined to certain of these arcuate supporting plates 29 and are adapted to raise and lower the fixture or jig so that the center axes of the tires loaded therein are always aligned with the longitudinal axis of the tubular member 15. It will be noted that the fixture 25 is considerably longer than the tubular member 15 so that the requisite number of tires may be loaded thereinto. The tires 12 may be loaded into the jig or fixture by hand or by automatic conveyor means as will be apparent to those skilled in the art. Also, the loading jig or fixture may include automatic dumping means for ejecting a loaded tire rack after the tires have been compressed.

The movable cart assembly 26 performs the function of moving the frame into the center openings of the aligned tires positioned in the jig or fixture 25 and applying the pressure to compress and squeeze the tires. The cart assembly 26 may comprise a base 31 mounting a plurality of wheels 32 adapted to engage and traverse a pair of parallel rails 33. The cart is adapted to be moved along the parallel rails 33 by any convenient means, such means being indicated as a chain drive in the drawing including a chain 34 having its ends attached to the front and rear of the movable cart and being entrained around sprockets 35 with suitable power means, not specifically shown, being provided for driving the chain. The parallel rails 33 are provided with adjustable stops 36 near the forward ends thereof for positively and accurately limiting the movement of the cart assembly 26.

Mounted near the forward end of the base 31 and extending vertically upwardly therefrom is a housing 39 which mounts on the forward face thereof a pair of forwardly extending projections 40 which are adapted to extend through the apertures 24 in the end plate 20 of one of the end assemblies to properly position the same and the frame 10 carried thereby. The cart also carries an annular pressure applying member 41 whose central aperture is of larger diameter than the diameter of the end plates 20 of the end assemblies which is mounted by the piston rods of the pressure applying fluid cylinders 42. It will be noted that the pressure applying cylinders 42 are mounted on suitable supporting structure to the rear of the housing 39 and that their piston rods extend through the housing 39 whereby the pressure applying plate 41 is movable relatively independently of the cart. As will be hereinafter more fully explained, the cart is first moved on the rails to position the frame within the tires and then the pressure applying cylinders 42 are actuated to compress and squeeze the tires.

The other portion of the loading installation, the support 27, includes a stanchion 44 rigidly mounted on the base having a rotatable member 47 journaled therein which mounts a pair of forwardly extending projections 45 adapted to be inserted in the apertures 24 of the other end assembly 11 to properly position this assembly. It is contemplated that the projections 40 and 45 as well as the apertures 24, will be so disposed that when the end assembly is attached to the support 27 that the slots 21 thereof will be perfectly aligned with the lugs 18 on the free end of the tubular member 15 supported by the movable cart. Mounted on the forward face of the stanchion 44 are four radially disposed short rod-like spacers 46 which are adapted to bear against the retaining plate 23 of the end assembly 11 to separate this plate from the end plate 20 in order that the collar 19 may be easily turned to lock the end assembly in place on the tubular member 15. Turning means, indicated generally by the reference numeral 48, are provided for rotating the rotatable member 47 and the collar 19 carried thereby to effect locking between the end assembly 11 and the frame 10.

In the operation of the loading installation the apparatus is positioned in the manner shown in Figure 4 with the movable cart 26 retracted and carrying one of the end assemblies and the frame while the support 27 carries the other of the end assemblies. Of course, the frame 10 is held in position by the locking means between it and the end assembly mounted on the movable cart 26. Tires are then loaded into the fixture or jig 25 in the manner shown with the lifting cylinders 30 operative to properly position the fixture with respect to the frame and the end assemblies. At this time the operator energizes the chain 34 to draw the cart 26 forward and the frame is inserted into the central opening of the tire. The cart moves forwardly until the abutment stops 36 are engaged and the cart is then retained in this position while the pressure applying cylinders 42 are energized to move the pressure applying member 41 against retaining plate 32 to force the end assembly and the frame inwardly to compress the tires. When the tires are compressed the desired amount and the projections 18 on the end of the tubular member 15 are in the slots 21 carried by the end assembly mounted on the support 27, the turning means 48 is energized to lock this end assembly in position. The cart 26 is then returned to its initial position and the loaded tire rack is removed from the fixture. Another empty tire rack is positioned in the installation and the apparatus is ready to load the same with tires. Of course, suitable control means can be incorporated whereby the entire loading operation is automatic and empty tire racks may be positioned in the installation by automatic conveyor means, if desired.

It should thus be apparent that we have accomplished the objects initially set forth. We have provided improved methods and apparatus for loading, unloading, storing and/or transporting vehicle tires which are characterized by their utmost simplicity in operation and structure. Although there has been described a preferred illustrated embodiment of the invention, it should be understood that many changes may be made therein without departing from the clear teachings of the invention. Accordingly, reference should be had to the following appended claims in determining the scope of the invention.

We claim:

1. Apparatus for preparing a unitized load of vehicle tires and the like for shipping and storage, wherein a multiplicity of axially aligned tires and the like are retained in axially compressed condition on an elongated structural member provided with end retaining members at least one of which has a quick detachable interconnection with one end of said elongated structural member, comprising means to support a multiplicity of tires and the like in axially aligned but uncompressed condition, means engaging and supporting one end of said elongated structural member and mounted for movement relative to said multiplicity of tires and the like longitudinally of the axis thereof whereby said elongated structural member may be moved into threading relation with said multiplicity of tires and the like from one axial end of said multiplicity of tires and the like, and means at the other axial end of said multiplicity of tires and the like to support said detachable retaining member in abutting relation to said other end of said tires and the like, the arrangement being such that upon continued inward threading movement of said elongated structural member through said tires and the like the tires and the like will be compressed axially and the leading end of the elongated structural member will be coupled with said detachable retaining member.

2. A unitized load of vehicle tires to facilitate shipping and storage thereof comprising a mandrel-like elongated structural member having received thereon a multiplicity of axially aligned vehicle tires and having at each end an annularly disposed retaining member for engaging the outer side walls of the end tires, said tires being in axial compression intermediate said retaining members, means to quickly attach and detach at least one of said retaining members to and from said elongated structural member, said elongated structural member being of light open frame-work construction having a plurality of circumferentially spaced and longitudinally extending sections adapted to engage the inner peripheries of the tires and thus to maintain the same in generally aligned relation.

3. A plant installation for preparing vehicle tires for shipping and storage which comprises means to support a plurality of tires in axially aligned relation, means to insert a structural member into the interior opening of a plurality of axially aligned tires, means to exert a force axially of said plurality of tires to compress the same to a portion of their original axial length, means to apply at least one end assembly to said structural member adjacent said plurality of tires while the same are still in compressed relation, and means to lock said end assembly to said structural member whereby said plurality of tires are maintained in compressed relation; said means to support comprising a fixture having a pair of axially extending spaced parallel rods, arcuate supporting members interconnecting said rods, and means to vertically move said fixture.

4. A plant installation for preparing vehicle tires for shipping and storage which comprises means to support a plurality of tires in axially aligned relation, means to insert a structural member into the interior opening of a plurality of axially aligned tires, means to exert a force axially of said plurality of tires to compress the same to a portion of their original axial length, means to apply at least one end assembly to said structural member adjacent said plurality of tires while the same are still in compressed relation, and means to lock said end assembly to said structural member whereby said plurality of tires are maintained in compressed relation; said means to insert comprising a longitudinally movable cart mounted for movement toward and away from said means to support, and means on said cart for supporting said structural member, and said means to exert being mounted on said cart.

5. Apparatus for supporting a compressed mass of a plurality of axially aligned resilent members for shipping and storage with each of said members having an appreciable axial dimension and a generally hollow cross section comprising a structural frame positioned axially of said compressed mass of said plurality of resilient members for supporting the same, a pair of end assemblies received adjacent the ends of said structural frame and bearing against the ends of said compressed mass of said plurality of resilient members, and means for detachably locking at least one of said end assemblies to said structural frame; at least one of said end assemblies comprising a collar adapted to be slidably received over one end portion of said structural frame, said collar having an abutment at the rear thereof, and a retaining plate adapted to bear against one end of said compressed mass of said plurality of resilient members being loosely mounted on said collar.

6. Apparatus for supporting a plurality of annular resilient members for shipping and storage which comprises a longitudinally extending frame adapted to be received axially within a plurality of said members, a first end assembly on one end of said frame adapted to engage and prevent movement of a plurality of said members received on said frame, a second end assembly on the other end of said frame adapted to engage and prevent axial movement of a plurality of said members received on said frame, at least said second end assembly being detachably mounted on said frame, said frame further comprising a longitudinally extending tubular member, a plurality of rods disposed radially outwardly of said tubular member and extending generally parallel therewith, and a plurality of struts extending from said tubular member to said rods for supporting the same.

7. Apparatus for supporting a plurality of annular resilient members for shipping and storage which comprises a longitudinally extending frame adapted to be received axially within a plurality of said members, a first end assembly on one end of said frame adapted to engage and prevent axial movement of a plurality of said members received on said frame, a second end assembly on the other end of said frame adapted to engage and prevent axial movement of a plurality of members received on said frame, at least said second end assembly being detachably mounted on said frame, said second end assembly comprising a collar slidably received over one end of said frame, a retaining plate adapted to bear against and prevent axial movement of said plurality of said members and being loosely mounted on said collar, means to lock said collar to said frame, said second end assembly comprising an end plate at the rear end thereof, abutment stops carried by said collar spaced forwardly of said end plate, and said end plate and said abutment stops forming limiting means for said retaining plate.

8. Apparatus for supporting a plurality of annular resilient members for shipping and storage which comprises a longitudinally extending frame adapted to be received axially within a plurality of said members, a first end assembly on one end of said frame adapted to engage and prevent axial movement of a plurality of said members received on said frame, a second end assembly on the other end of said frame adapted to engage and prevent axial movement of a plurality of said members received on said frame, at least said second end assembly being detachably mounted on said frame, said second end assembly comprising a collar slidably received over one end of said frame, a retaining plate adapted to bear against and prevent axial movement of said plurality of said members and being loosely mounted on said collar, means to lock said collar to said frame, said means to lock comprising a projection on said frame and a slot in said collar, said slot extending axially of said collar for a portion of its length, said slot extending circumferentially of said collar for another portion of its length, and said projection adapted to be inserted in said slot to detachably lock said second end assembly to said frame.

9. Apparatus according to claim 4 further characterized in that said means to exert comprises a pressure plate disposed forwardly of said means on said cart for supporting, means to move said pressure applying plate mounted on said cart rearwardly of said means on said cart for supporting, and said means to move including a fluid cylinder.

References Cited in the file of this patent

UNITED STATES PATENTS

| | | |
|---|---|---|
| 1,354,371 | Angier | Sept. 28, 1920 |
| 1,485,289 | Peterson | Feb. 26, 1924 |
| 2,033,201 | MacChesney | Mar. 10, 1936 |